United States Patent
Debates et al.

(10) Patent No.: US 10,212,601 B2
(45) Date of Patent: Feb. 19, 2019

(54) HARDWARE VERIFICATION WITH RFID-STORED BUILD INFORMATION

(71) Applicant: Motorola Mobility LLC, Chicago, IL (US)

(72) Inventors: Scott Debates, Crystal Lake, IL (US); Jarrett K Simerson, Glenview, IL (US); Hong Zhao, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 288 days.

(21) Appl. No.: 15/002,838

(22) Filed: Jan. 21, 2016

(65) Prior Publication Data
US 2017/0215075 A1    Jul. 27, 2017

(51) Int. Cl.
*H04W 12/12* (2009.01)
*H04M 3/42* (2006.01)
*H04W 4/80* (2018.01)
*H04W 12/10* (2009.01)

(52) U.S. Cl.
CPC ....... *H04W 12/12* (2013.01); *H04M 3/42178* (2013.01); *H04W 4/80* (2018.02); *H04W 12/10* (2013.01)

(58) Field of Classification Search
CPC ....... H04W 12/12; H04W 4/008; H04W 4/80; H04W 12/10; H04M 3/42178
See application file for complete search history.

(56) References Cited

U.S. PATENT DOCUMENTS

| 8,068,614 | B2* | 11/2011 | Kumar | G06F 21/575 380/285 |
| 9,659,171 | B2* | 5/2017 | Treweek | G06F 21/554 |
| 2007/0183194 | A1* | 8/2007 | Devadas | G06F 21/31 365/185.03 |
| 2008/0100443 | A1* | 5/2008 | Grunwald | H04L 63/0492 340/572.1 |
| 2012/0317662 | A1 | 12/2012 | Neo et al. | |
| 2014/0325652 | A1 | 10/2014 | Etchegoyen | |
| 2016/0004867 | A1 | 1/2016 | Gillespie et al. | |

OTHER PUBLICATIONS

"Combined Search and Examination Report", GB Application No. 1700977.0, dated Jul. 7, 2017, 7 pages.

* cited by examiner

*Primary Examiner* — Ian N Moore
*Assistant Examiner* — Latresa A McCallum
(74) *Attorney, Agent, or Firm* — Wolfe-SBMC

(57) ABSTRACT

In embodiments of hardware verification with RFID-stored build information, a mobile device includes hardware components and a radio-frequency identification (RFID) tag to store build information for hardware verification of the hardware components in the mobile device. A bootloader can interrogate the RFID tag to obtain the build information and compare the build information to current information of the hardware components in the mobile device. The bootloader can then determine whether the current information matches the build information. If the current information does not match the build information, then a message can be displayed on the mobile device indicating that unauthorized hardware is installed in the mobile device.

20 Claims, 4 Drawing Sheets

HARDWARE VERIFICATION WITH RFID-STORED BUILD INFORMATION

BACKGROUND

Portable devices, such as mobile phones, tablet devices, communication devices, and other types of computing and electronic devices are ever-increasing in availability and in different configurations of features and hardware. Some of these type devices, such as mobile phones, are starting to be available as a user-configurable consumer product, both before and after purchase. For example, a user may select specific hardware components to configure a mobile phone, such as specifying display size, camera resolution, battery capacity, processor speed, and/or memory size. However, designing a mobile device for configurability opens up the possibility of users changing the hardware configuration and components after purchase, and causing potential damage.

Further, a user may replace original equipment hardware components with inferior components of smaller capacity, lower resolution, slower speed, etc., and then look to have a mobile phone replaced or swapped for a newer one that has the better components, which are comparable to the original device hardware configuration and components. This can have a direct impact on warranty and service costs for a manufacturer of the device. Further, particularly challenging is selectable memory that can be easily unplugged and swapped-out for a lower-capacity memory. More importantly, changing out the memory can replace or eliminate the entire boot image and hardware configuration setup information for a mobile device.

BRIEF DESCRIPTION OF THE DRAWINGS

Embodiments of hardware verification with RFID-stored build information are described with reference to the following Figures. The same numbers may be used throughout to reference like features and components that are shown in the Figures.

DETAILED DESCRIPTION

Figure 1:
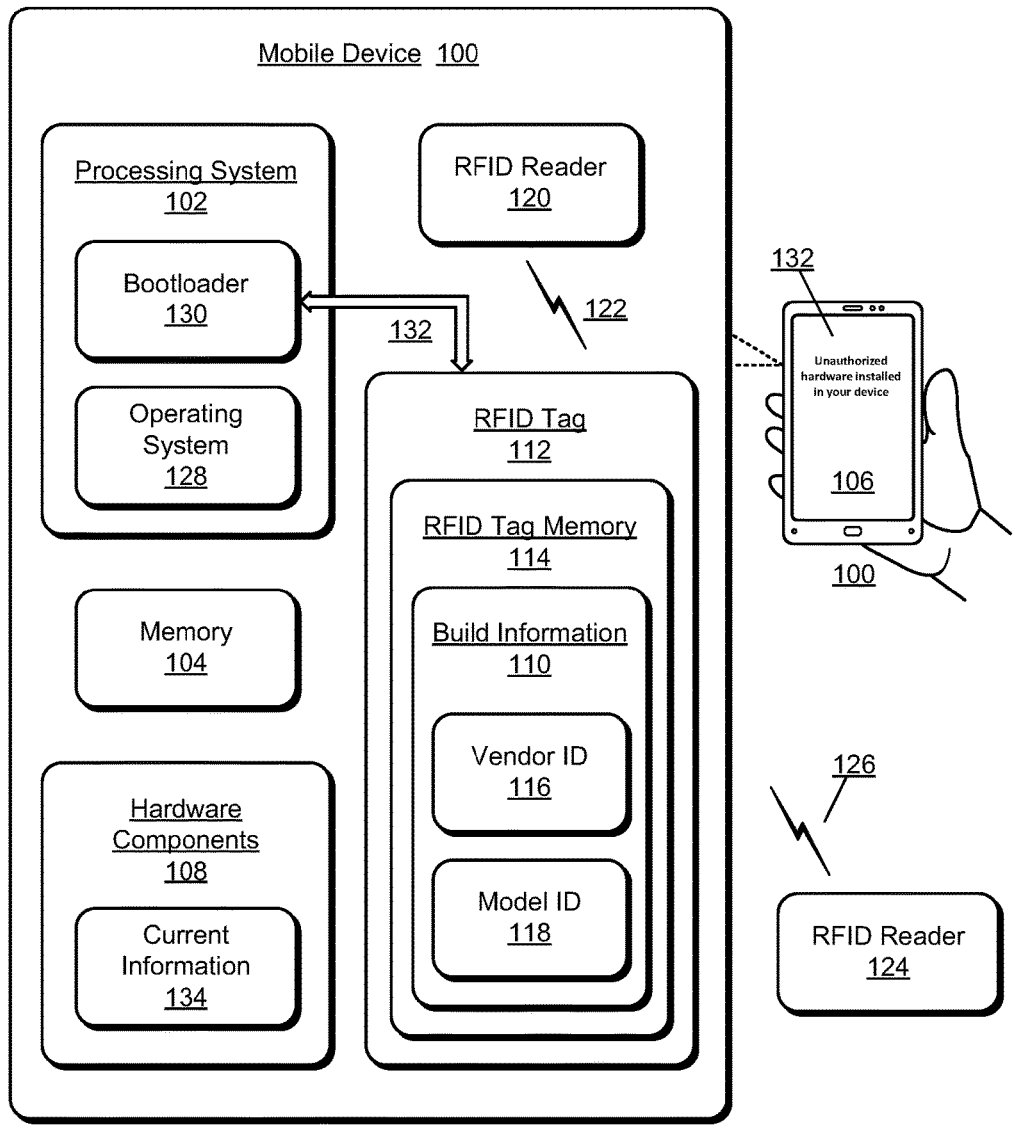
FIG. 1 illustrates an example mobile device in which embodiments of hardware verification with RFID-stored build information can be implemented.

Embodiments of hardware verification with RFID-stored build information are described, such as for any type of mobile device that may be available as a user-configurable consumer product. For example, a user can purchase a mobile phone and select specific hardware components to configure the device for purchase, such as by specifying display size, camera resolution, battery capacity, processor speed, and/or memory size. When the selected hardware components are installed and the device is assembled, the manufacturer can encrypt the international mobile station equipment identity (IMEI) of the device with the hardware specific configuration parameters, and store encrypted build information in the memory of a radio-frequency identification (RFID) tag included in the device.

The stored build information can then be obtained at a service center when a technician later services and/or upgrades the device. The original equipment hardware configuration of the device can be verified by comparing the current hardware configuration information to the stored, encrypted build information, and determining whether one or more of the hardware components have been changed or swapped-out. For example, a mobile phone can include a bootloader application that is initiated when the device is powered-up, and queries the RFID tag to obtain, decrypt, and compare the encrypted build information against the current hardware configuration information. If the build information matches the current hardware configuration information, then the mobile phone can continue to boot-up for normal operation. However, if the build information does not match the current hardware configuration information, the mobile phone may be started for operation with limited functionality, such as only being able to initiate an outgoing phone call.

In aspects of hardware verification with RFID-stored build information, a mobile device can include hardware components and a radio-frequency identification (RFID) tag to store build information for hardware verification of the hardware components in the mobile device. A bootloader can interrogate the RFID tag to obtain the build information and compare the build information to current information of the hardware components in the mobile device. The bootloader can then determine whether the current information matches the build information. If the current information does not match the build information, then a message can be displayed on the mobile device indicating that unauthorized hardware is installed in the mobile device. Further, an operating system of the mobile device can be loaded for restricted functionality in the mobile device, as well as one or more of the hardware components having limited functionality. Alternatively, if the build information does match the current information of the hardware components in the mobile device, then the operating system can be loaded for unrestricted functionality in the mobile device.

While features and concepts of hardware verification with RFID-stored build information can be implemented in any number of different devices, systems, environments, and/or configurations, embodiments of hardware verification with RFID-stored build information are described in the context of the following example devices, systems, and methods.

FIG. 1 illustrates an example mobile device 100 in which embodiments of hardware verification with RFID-stored build information can be implemented. The example mobile device 100 may be any type of mobile phone, tablet device, digital camera, or other types of computing and electronic devices. The mobile device 100 can be implemented with various components, such as a processing system 102 (e.g., one or more processors), a memory 104, an integrated display device 106, and any number and combination of various components as further described with reference to the example device shown in FIG. 4. Although not shown, the mobile device 100 can also include a power source, such as a battery, to power the various device components. Further, the mobile device 100 can include the different wireless radio systems, such as for Wi-Fi, Bluetooth™, Mobile Broadband, LTE, Near Field Communication (NFC), or any other wireless communication system or format for communication via respective wireless networks.

Generally, any one or more of the various components of the mobile device are collectively the hardware components 108 of the mobile device (e.g., to include the processor, memory, integrated display device, a camera device, and/or other hardware specific configurations). As noted above, a user may order and purchase a mobile device (e.g., a mobile phone) with a specific hardware configuration of components, such as with additional memory, a faster processor, a better camera, a specific display size, battery capacity, etc. When the mobile device 100 is assembled and the specific hardware configuration of components are installed in the device, build information 110 corresponding to the hardware configuration of the components can be stored, or encrypted and stored, in the device for later access and hardware verification. In embodiments, the build information 110 can be encrypted using the hardware configuration of the mobile device 100 and an international mobile station equipment identity (IMEI) prior to storing the build information.

In this example, the mobile device 100 includes a radio-frequency identification (RFID) tag 112 that has a RFID tag memory 114 implemented to store the build information 110, as well as other identifying data and/or information associated with the mobile device 100. Alternatively, any suitable non-volatile memory (e.g., the device memory 104) can be used to store the identifying data and/or information that is associated with the mobile device 100 separate from the RFID tag 112. Generally, RFID tags are small electronic tags or labels that can be programmed with the build information, identifying data, and/or other information associated with the mobile device 100. In this example, the build information includes a vendor identifier (ID) 116 and/or a model ID 118 for each of the hardware components 108 installed during manufacture and assembly of the mobile device. The vendor ID 116 associated with a hardware component 108 identifies the a manufacturer of the particular hardware component, and the model ID associated with the hardware component 108 can include any identifying information, such as a particular model number, product name, serial number, memory size, display resolution, and the like as it pertains to each respective hardware component 108.

Although only the one RFID tag 112 is shown and described as being implemented in the mobile device 100, each of the hardware components 108 (e.g., to include the processor, memory, integrated display device, a camera device, and/or other hardware components) may include an individual RFID tag that stores configuration and build information for the respective hardware component. Generally, the RFID tags (e.g., the RFID tag 112) are small electronic tags or labels that can be programmed with identifying data or other information (e.g., the build information 110). A RFID tag can include an ASIC/CPU module, as well as a communication bus for communicating with the processing system 102. In response to receipt of an interrogation signal, the ASIC/CPU module of the RFID tag formulates a response that may include the stored information from the RFID tag.

In implementations, a mobile device may also include a RFID reader 120 (also referred to as a RFID interrogator) that is implemented for two-way wireless communication 122 with radio-frequency identification (RFID) tags, such as the RFID tag 112 that is activated in the presence of the RFID reader 120 when interrogated for sensor data, such as the build information 110 and/or other device identifying data. The RFID reader 120 can transmit an interrogation signal as a broadcast message requesting RFID tags that are in range to return the identifying data or information that the RFID tags have stored. The RFID tags can then wirelessly communicate the data information to the RFID reader via a radio frequency (RF) communication channel. Additionally, an RFID reader 124 that is external to the mobile device can be utilized for two-way wireless communication 126 with the RFID tag 112. The external RFID reader 124 can be utilized to program the build information 110 into the mobile device 100, such as when the device is manufactured, and the downloaded build information is maintained by the RFID tag memory 114 in the RFID tag 112.

In this example, the processing system 102 includes an operating system 128 and a bootloader 130 (also referred to as a bootloader application) that is implemented to initialize a power-on or startup process of the mobile device 100. The bootloader 130 can be implemented as a software application or module, such as computer-executable software instructions that are executable with a processor (e.g., with the processing system 102) to implement embodiments of hardware verification with RFID-stored build information as described herein. As software applications, the operating system 128 and the bootloader 130 can be stored on computer-readable storage memory (e.g., the device memory 104), such as any suitable memory device or electronic data storage implemented in the mobile device.

In implementations, the bootloader 130 can include the RFID reader 120 as an integrated component to obtain the build information 110 from the RFID tag memory 114 of the RFID tag 112. Alternatively, the RFID tag 112 can communicate the build information 110 to the bootloader 130 of the processing system 102 via a communication bus 132, such as any form of an I2C, SPI, UART, or other type of communication bus. When the mobile device 100 is powered-on, the bootloader 130 is implemented to execute before the operating system 128 or other software modules. The bootloader 130 can communicate with and interrogate the RFID tag 112 (e.g., via the RFID reader 120 or the communication bus 132) to obtain the build information 110 for hardware verification of the hardware components 108 in the mobile device. If the build information 110 was encrypted prior to being stored in the RFID tag memory 114 of the RFID tag 112, then the bootloader 130 can decrypt the build information when retrieved from the RFID tag memory. Alternatively or in addition, access to the RFID tag memory 114 can be passcode protected, and the bootloader 130 provides a passcode to gain access to the RFID tag memory when retrieving the build information.

Additionally, the bootloader 130 can query each of the hardware components 108 to obtain current information 134 for each of the respective hardware components via the communication bus 132. Generally, the current information 134 includes the same type of hardware component configuration information as the build information 110, such as a vendor ID and/or a model ID of each hardware component, to include any type of identifying information, such as a particular model number, product name, serial number, memory size, display resolution, and the like as it pertains to each respective hardware component 108.

In embodiments, the bootloader 130 can compare the build information 110 with the current information 134 for each of the respective hardware components 108, and based on whether the current information matches the build information, execute different instructions based on the comparison result. For example, the bootloader 130 can determine that the current information 134 of a hardware component 108 does match the build information 110 for the hardware component, and initiate loading the operating system 128 for unrestricted functionality in the mobile device 100.

Alternatively, the bootloader 130 can determine that the current information 134 of a hardware component 108 does not match the build information 110 for the hardware component, and initiate displaying a message 132 on the display device 106 indicating that the current information and build information associated with the particular hardware component do not match (e.g., indicating unauthorized, non-verified hardware is installed in the device). The bootloader 130 can then replace the build information 110 in the RFID tag memory 114 of the RFID tag 112 with the current information 134 that does not match the build information of the hardware components. Additionally, the bootloader 130 can then load the operating system 128 with limited or restricted functionality in the mobile device.

For example, when the current information 134 and the build information 110 do not match, the operating system 128 can be executed with limited functionality and the hardware component that does not match the build information can be disabled or restricted. In implementations, the operating system may still function to allow a user making a phone call with the mobile device, but limit other communication features of the device. In other instances, the mobile device 100 may be manufactured with a hardware component that can be limited based on the build information. For example, the device memory 104 may be installed in the mobile device 100 as a 128 GB memory, but then limited to a smaller size (e.g., 16 GB) when the operating system 128 operates with limited functionality.

Example methods 200 and 300 are described with reference to respective FIGS. 2 and 3 in accordance with implementations of hardware verification with RFID-stored build information. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 2:
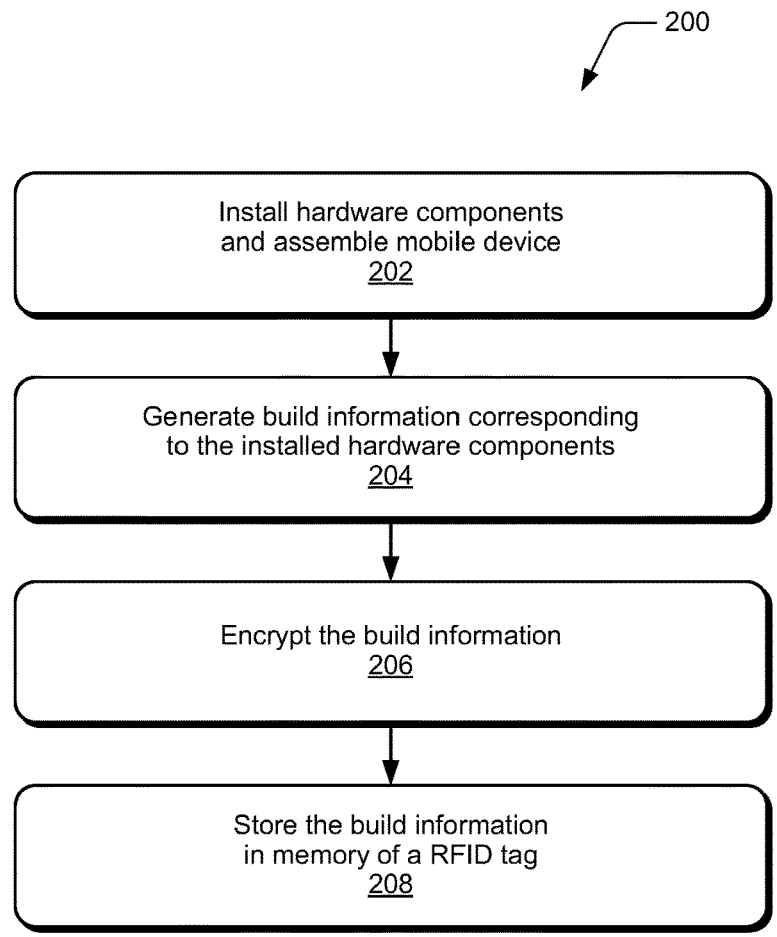
FIG. 2 illustrates example method(s) of hardware verification with RFID-stored build information in accordance with one or more embodiments.

FIG. 2 illustrates example method(s) 200 of hardware verification with RFID-stored build information. The order in which the method is described is not intended to be construed as a limitation, and any number or combination of the described method operations can be performed in any order to perform a method, or an alternate method.

At 202, hardware components are installed and a mobile device is assembled. For example, during manufacture of the mobile device 100, the RFID tag 112, the processing system 102, the memory 104, the display device 106, and other various components (e.g., collectively, the hardware components 108) of the hardware configuration are installed, and the mobile device 100 is assembled.

At 204, build information corresponding to the installed hardware components is generated. For example, the build information 110 that is stored in the RFID tag memory 114 of the RFID tag 112 is generated based on the hardware components that are installed in the mobile device 100 during manufacture and assembly. The mobile device 100 can be attached to a test fixture after the assembly and manufacture process, and the test fixture is implemented to generate build information. Alternatively, the mobile device 100 can be booted into a test mode or manufacture mode after assembly, and the build information 110 is generated and stored in the RFID tag memory 114 of the RFID tag 112 in the mobile device 100. The test mode or manufacture mode can be a specific setting, such as setting an I/O line on the processing system 102 to a particular state to indicate that the bootloader 130 should not be executed during the test or manufacture modes. Under normal operating conditions (i.e., user operation), the bootloader 130 (also referred to as the bootloader application) is executed before the operating system 128 or other software module.

At 206, the build information is encrypted and, at 208, the build information is stored in memory of a radio-frequency identification (RFID) tag. For example, the bootloader 130 encrypts the build information 110 that has been generated, and communicates with the RFID tag 112 in the mobile device 100 to store the build information 110 in the RFID tag memory 114. Alternatively, a test fixture or device generates and encrypts the build information 110 after manufacture of the mobile device 100, and communicates with the RFID tag 112 to store the generated build information in the RFID tag memory 114. For example, the external RFID reader 124 communicates 126 with the RFID tag 112 and can be utilized to program the build information 110 into the mobile device 100, and the downloaded build information is maintained by the RFID tag memory 114 in the RFID tag.

Figure 3:
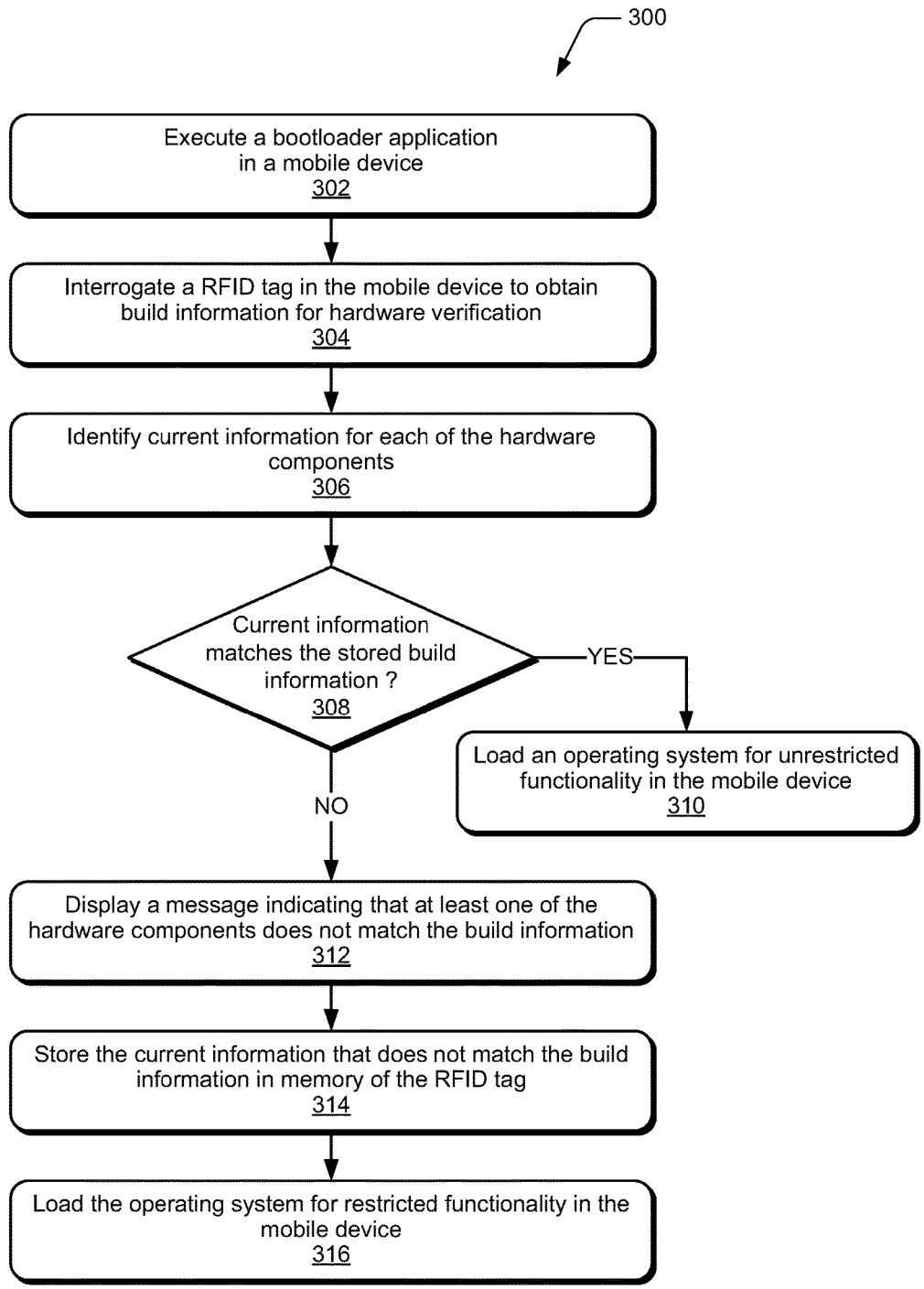
FIG. 3 illustrates example method(s) of hardware verification with RFID-stored build information in accordance with one or more embodiments.

FIG. 3 illustrates example method(s) 300 of hardware verification with RFID-stored build information. The order in which the method is described is not intended to be construed as a limitation, and any number or combination of the described method operations can be performed in any order to perform a method, or an alternate method.

At 302, a bootloader application is executed in a mobile device. For example, the bootloader 130 (also referred to as the bootloader application) in the mobile device 100 is executed by the processing system 102 when the mobile device is powered-up for use.

At 304, a radio-frequency identification (RFID) tag in the mobile device is interrogated to obtain build information for hardware verification of hardware components in the mobile device. For example, the bootloader 130 interrogates the RFID tag 112 to obtain the build information 110 that is stored in the RFID tag memory 114. The build information 110 corresponds to when the hardware components 108 are installed during manufacture and assembly of the mobile device, and the build information includes the vendor identifier (ID) 116 and/or the model ID 118 for each of the respective hardware components. In implementations, access to the RFID tag memory 114 can be passcode protected and the bootloader 130 provides the passcode during interrogation of the RFID tag 112 to gain access to the RFID tag memory 114. Alternatively or in addition, the build information 110 can be encrypted prior to the build information being stored in the RFID tag memory 114, as described with reference to FIG. 2. Accordingly, the bootloader 130 can then decrypt the build information 110 subsequent to obtaining the build information from the RFID tag 112.

At 306, current information for each of the hardware components in the mobile device is identified. For example, the bootloader 130 that is implemented in the mobile device 100 identifies the current information 134 (e.g., a vendor ID and/or a model ID) for each of the respective hardware components 108 that are installed in the mobile device 100. Identifying the current information can include the bootloader 130 obtaining the current hardware configuration information from each of the hardware components 108.

At 308, a determination is made as to whether the current information matches the stored build information. For example, the bootloader 130 that is implemented in the mobile device 100 determines whether the current information 134 for each of the hardware components 108 matches the build information 110 for each of the respective hardware components. In implementations, the bootloader 130 compares the vendor identifier (ID) and/or model ID of the build information 110 to the vendor identifier (ID) and/or model ID of the current information 134 for each of the hardware components 108 to determine whether the hardware components are the ones installed during manufacture of the device.

If the build information and the current information match (i.e., "Yes" from 308), then at 310, an operating system is loaded for unrestricted functionality in the mobile device. For example, the bootloader 130 determines that the build information 110 and the current information 134 for the respective hardware components 108 match, and the bootloader initiates loading the operating system 128 for unrestricted functionality in the mobile device 100.

If the build information and the current information do not match (i.e., "No" from 308), then at 312, a message is displayed to indicate to a user that at least one of the hardware components does not match the build information (i.e., to indicate that an unauthorized hardware component is installed). For example, the bootloader 130 determines that the build information 110 and the current information 134 for a respective hardware component does not match, and the bootloader 130 initiates displaying a message on the integrated display device 106, indicating that at least one unauthorized hardware component 108 is installed in the mobile device 100.

At 314, the current information that does not match the build information is stored in memory of the RFID tag. For example, the bootloader 130 replaces the build information 110 in the RFID tag memory 114 of the RFID tag 112 with the current information 134 that does not match the build information of the hardware components. At 316, the operating system is loaded for restricted functionality in the mobile device. For example, the bootloader 130 initiates loading the operating system 128 with limited or restricted functionality in the mobile device 100.

Figure 4:
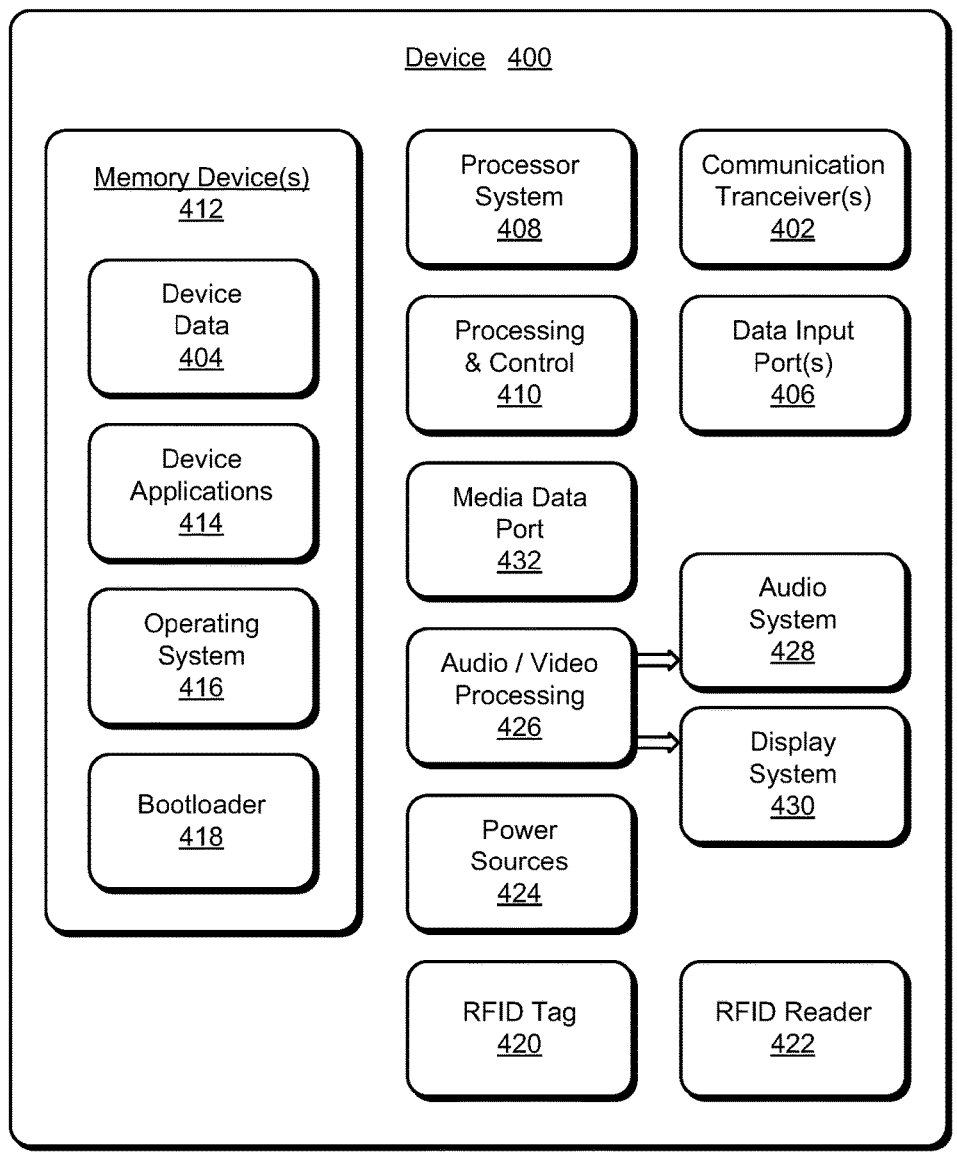
FIG. 4 illustrates various components of an example device that can implement embodiments of hardware verification with RFID-stored build information.

FIG. 4 illustrates various components of an example device 400 in which embodiments of hardware verification with RFID-stored build information can be implemented. The example device 400 can be implemented as any of the computing devices described with reference to the previous FIGS. 1-3, such as any type of client device, mobile phone, tablet, computing, communication, entertainment, gaming, media playback, and/or other type of device. For example, the mobile device 100 shown in FIG. 1 may be implemented as the example device 400.

The device 400 includes communication transceivers 402 that enable wired and/or wireless communication of device data 404 with other devices, where the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 400 may also include one or more data input ports 406 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 400 includes a processing system 408 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 410. The device 400 may further include any type of a system bus or other data and command transfer system that couples the various components within the device. A system bus can include any one or combination of different bus structures and architectures, as well as control and data lines.

The device 400 also includes computer-readable storage memory 412 that enable data storage, such as data storage devices that can be accessed by a computing device, and that provide persistent storage of data and executable instructions (e.g., software applications, programs, functions, and the like). Examples of the computer-readable storage memory 412 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 400 may also include a mass storage media device.

The computer-readable storage memory 412 provides data storage mechanisms to store the device data 404, other types of information and/or data, and various device applications 414 (e.g., software applications). For example, an operating system 416 can be maintained as software instructions with a memory device and executed by the processing system 408. The device applications may also include a device manager, such as any form of a control application, software application, signal-processing and control module, code that is native to a particular device, a hardware abstraction layer for a particular device, and so on. In this example, the device 400 includes a bootloader 418 that implements embodiments of hardware verification with RFID-stored build information, and may be implemented with hardware components and/or in software, such as when the device 400 is implemented as the mobile device 100 described with reference to FIGS. 1-3. An example of the bootloader 418 is the bootloader 130 that is implemented as an application in the mobile device 100.

The device 400 also includes a radio-frequency identification (RFID) tag 420 and an RFID reader 422, such as described with reference to the RFID tag 112 and RFID reader 120 that are implemented in the mobile device 100. The device 400 can also include one or more power sources 424, such as when the device is implemented as a mobile device. The power sources may include a charging and/or power system, and can be implemented as a flexible strip battery, a rechargeable battery, a charged super-capacitor, and/or any other type of active or passive power source.

The device 400 also includes an audio and/or video processing system 426 that generates audio data for an audio system 428 and/or generates display data for a display system 430. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 432. In implementations, the audio system and/or the display system are integrated components of the example device. Alternatively, the audio system and/or the display system are external, peripheral components to the example device.

Although embodiments of hardware verification with RFID-stored build information have been described in language specific to features and/or methods, the subject of the appended claims is not necessarily limited to the specific features or methods described. Rather, the specific features and methods are disclosed as example implementations of hardware verification with RFID-stored build information, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method, comprising:
   interrogating a radio-frequency identification (RFID) tag in a mobile device to obtain build information for hardware verification of one or more hardware components in the mobile device;
   identifying current information for each of the one or more hardware components;
   determining, for each of the one or more hardware components, whether the current information matches the build information based on a vendor identifier (ID) associated with each of the one or more hardware components and included in the current information and the build information;
   responsive to the determination that the current information does not match the build information, displaying a message indicating that at least one of the one or more hardware components does not match the build information and storing, in a memory of the RFID tag, the current information that does not match the build information for each of the one or more hardware components before an operating system is loaded; and
   loading the operating system for restricted functionality in the mobile device.

2. The method as recited in claim 1, further comprising:
   executing a bootloader that performs the interrogating, the identifying, and the determining; and
   responsive to the determination that the current information does match the build information, loading the operating system for unrestricted functionality in the mobile device.

3. The method as recited in claim 1, wherein the current information and the build information includes the vendor identifier (ID) and a model ID for each of the one or more hardware components.

4. The method as recited in claim 1, wherein the build information corresponds to when the one or more hardware components are installed during manufacture and assembly of the mobile device.

5. The method as recited in claim 1, further comprising:
   encrypting the build information prior to storing the build information in the RFID tag; and
   decrypting the build information to determine whether the current information matches the build information.

6. The method as recited in claim 1, wherein said identifying the current information comprises interrogating each of the one or more hardware components to obtain the current information.

7. The method as recited in claim 1, wherein responsive to the determination that the current information does not match the build information, the method further comprising limiting functionality of at least the one or more hardware components.

8. A mobile device, comprising:
   one or more hardware components;
   a radio-frequency identification (RFID) tag to store configuration information of the mobile device for hardware verification, the configuration information including build information for each of the one or more hardware components in the mobile device;
   a memory and processing system to implement a bootloader to:
      identify current information for each of the one or more hardware components;
      determine, for each of the one or more hardware components, whether the current information matches the build information based on a vendor identifier (ID) associated with each of the one or more hardware components and included in the current information and the build information;
      responsive to the determination that the current information does not match the build information, initiate display of a message that indicates at least one of the one or more hardware components does not match the build information and store the current information in a memory of the RFID tag for the at least one of the one or more hardware components before an operating system is loaded; and
      load the operating system for restricted functionality in the mobile device.

9. The mobile device as recited in claim 8, wherein, responsive to the determination that the current information does not match the build information, the bootloader limits functionality of the one or more hardware components.

10. The mobile device as recited in claim 8, wherein the current information and the build information includes the vendor identifier (ID) and a model ID for each of the one or more hardware components.

11. The mobile device as recited in claim 8, wherein the build information corresponds to when the one or more hardware components are installed during manufacture and assembly of the mobile device.

12. The mobile device as recited in claim 8, wherein the build information is encrypted prior to being stored in the RFID tag, and the bootloader decrypts the build information to determine whether the current information matches the build information.

13. The mobile device as recited in claim 8, wherein the bootloader interrogates each of the one or more hardware components to identify the current information.

14. The mobile device as recited in claim 8, wherein, responsive to the determination that the current information does match the build information, the bootloader loads the operating system for unrestricted functionality in the mobile device.

15. A system, comprising:
   a radio-frequency identification (RFID) tag to store build information for hardware verification of a hardware component installed in a device during manufacture;
   a bootloader that is executable in the device to:
      obtain current information corresponding to the hardware component;
      determine whether the current information matches the build information of the hardware component based on a vendor identifier (ID) associated with the hardware component and included in the current information and the build information;
      responsive to a determination that the current information does not match the build information, store the current information that does not match the build information for the hardware component in a memory of the RFID tag before an operating system is loaded; and
      load the operating system for restricted functionality.

16. The system as recited in claim 15, wherein, responsive to the determination that the current information does not match the build information, the bootloader initiates to display of a message that indicates the hardware component does not match the build information.

17. The system as recited in claim 15, wherein the bootloader, responsive to a determination that the current information does match the build information, loads the operating system for unrestricted functionality in the mobile device.

18. The system as recited in claim 15, wherein the build information and the current information corresponding to the hardware component includes the vendor identifier (ID) and a model ID.

19. The system as recited in claim 15, wherein the build information is encrypted prior to being stored in the memory of the RFID tag, and the bootloader decrypts the build information prior to the determination of whether the current information matches the build information of the hardware component.

20. The system as recited in claim 15, wherein the hardware component is device memory and the bootloader, responsive to the determination that the current information does not match the build information, limits access to the device memory.

* * * * *